(12) United States Patent
Grande et al.

(10) Patent No.: US 9,747,149 B2
(45) Date of Patent: Aug. 29, 2017

(54) FIRMWARE DUMP COLLECTION FROM PRIMARY SYSTEM DUMP DEVICE ADAPTER

(71) Applicant: International Business Machines Corporation, Armonk, NY (US)

(72) Inventors: Marcus B. Grande, Pflugerville, TX (US); Brian W. Hart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/367,305

(22) Filed: Dec. 2, 2016

(65) Prior Publication Data

US 2017/0075751 A1    Mar. 16, 2017

Related U.S. Application Data

(63) Continuation of application No. 15/051,701, filed on Feb. 24, 2016, which is a continuation of application No. 14/542,689, filed on Nov. 17, 2014, now Pat. No. 9,535,783, application No. 15/367,305, filed on Dec. 2, 2016, which is a continuation of application No.
(Continued)

(51) Int. Cl.
*G06F 11/07* (2006.01)
*G06F 13/00* (2006.01)

(52) U.S. Cl.
CPC ........ *G06F 11/0778* (2013.01); *G06F 11/073* (2013.01); *G06F 11/0709* (2013.01); *G06F 11/0748* (2013.01); *G06F 11/0751* (2013.01); *G06F 11/0775* (2013.01); *G06F 11/0793* (2013.01); *G06F 13/00* (2013.01)

(58) Field of Classification Search
CPC ............. G06F 11/0766; G06F 11/079; G06F 11/3476; G06F 11/0787; G06F 11/0757; G06F 11/14; G06F 9/3861; G06F 9/4418; G06F 13/364; G06F 13/24
See application file for complete search history.

(56) References Cited

U.S. PATENT DOCUMENTS 7,681,089 B2    3/2010   Ashmore
8,245,085 B2 *  8/2012   Ueba .................. G06F 11/0778
                                                                   707/642
(Continued)

OTHER PUBLICATIONS

IBM: List of IBM Patents or Patent Applications Treated as Related (Appendix P), Jan. 4, 2017, 2 pages.
(Continued)

*Primary Examiner* — Nadeem Iqbal
(74) *Attorney, Agent, or Firm* — Teddi E. Maranzano

(57) ABSTRACT

A method of firmware dump collection from a primary dump adapter is provided. The method includes identifying a primary system dump device and a secondary system dump device. An operating system (OS) dump coordinator writes non-disruptive state data to the primary system dump device, and writes disruptive state data to the secondary system dump device. Non-disruptive state data is requested from a hardware device adapter that is connected to the non-primary system dump device. Disruptive state data is requested from the hardware device adapter that is connected to the primary system dump device. The non-disruptive state data is written to the primary system dump device. Disruptive state data is written to the secondary system dump device.

1 Claim, 4 Drawing Sheets

Related U.S. Application Data

14/542,689, filed on Nov. 17, 2014, now Pat. No. 9,535,783.

(56) References Cited

U.S. PATENT DOCUMENTS

| | | | |
|---|---|---|---|
| 8,489,933 B2 | 7/2013 | Yoshida et al. | |
| 8,990,634 B2 * | 3/2015 | Sadovsky | G06F 11/0748 714/25 |
| 9,535,783 B2 * | 1/2017 | Grande | G06F 11/0778 |
| 2006/0143534 A1 | 6/2006 | Dall | |
| 2007/0220350 A1 | 9/2007 | Ogasawara et al. | |
| 2008/0133968 A1 | 6/2008 | Muppirala et al. | |
| 2011/0078520 A1 | 3/2011 | Nakai | |
| 2012/0254667 A1 | 10/2012 | Zhang et al. | |
| 2013/0159562 A1 | 6/2013 | Ando | |
| 2016/0139978 A1 * | 5/2016 | Grande | G06F 11/0778 714/45 |
| 2016/0154696 A1 * | 6/2016 | Grande | G06F 11/0778 714/38.11 |

OTHER PUBLICATIONS

Pending U.S. Appl. No. 15/367,321, filed Dec. 2, 2016, entitled: "Firmware Dump Collection From Primary System Dump Device Adapter", 22 pages.
Pending U.S. Appl. No. 15/367,321, filed Dec. 2, 2016, enfitled: "Firmware Dump Collection From Primary System Dump Device Adapter", 22 pages.

* cited by examiner

FIRMWARE DUMP COLLECTION FROM PRIMARY SYSTEM DUMP DEVICE ADAPTER

BACKGROUND

This disclosure relates generally to computer systems, and more particularly to firmware dump collection from a primary system dump device adapter.

A critical component of successful customer support is the ability to diagnose a problem with the data gathered during an initial failure. This may be referred to as First Failure Data Capture (FFDC). Requiring a recreation of the problem to gather sufficient data (Second Failure Data Capture, or SFDC) is undesirable, and sometimes is not possible.

A computer system dump includes the contents of the system memory regions that are in use in a computer at a given point in time. The operating system control structures, such as page tables, status flags, control registers, program counter and stack pointer are also captured in the computer system dump. The computer system dump may also include state data for each device driver registered with the operating system. Data collection from the hardware device adapters that are connected to the hardware devices that are installed on the system may also be included in the system dump. The operating state of the adapter firmware, which is program code that is executed on a hardware device adapter, may be required to resolve a system failure. Attempting firmware data collection may disable the hardware device adapter until it is reset by the next computer power recycle. However, a hardware device adapter that is connected to the computer system dump device cannot be rendered unusable, because some or all of the collected system dump data may be lost. Consequently FFDC may be prevented if the firmware dump from the system dump device adapter is required to diagnose a system failure.

SUMMARY

According to one embodiment, a method of firmware dump collection from a primary dump adapter is provided. The method includes: identifying a primary system dump device and a secondary system dump device, whereby an operating system (OS) dump coordinator writes non-disruptive state data to the primary system dump device, and whereby the operating system dump coordinator writes disruptive state data to the secondary system dump device. The method also includes: requesting non-disruptive state data from a hardware device adapter, based on the hardware device adapter not being connected to the primary system dump device; requesting disruptive state data from the hardware device adapter, based on the hardware device adapter being connected to the primary system dump device. The method also includes: writing non-disruptive state data to the primary system dump device; and writing disruptive state data to the secondary system dump device.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure relates generally to the field of computer systems, and more particularly to firmware dump collection from a primary system dump device adapter. Firmware dump collection, also referred to as firmware state data collection, may be either disruptive or non-disruptive, depending upon its effect on the functioning of the hardware device adapter. State data collection may be referred to as non-disruptive if the collection does not interrupt the writing of the overall dump data to the system primary dump device. For example, state data collection of a hardware device adapter is considered non-disruptive if the hardware device adapter is not connected to the system primary dump device. However, attempting state data collection from a hardware device adapter that is connected to the system primary dump device may disable the hardware device adapter until it is reset by the next computer power recycle. Therefore, this type of state date collection may be referred to as disruptive since it interrupts the writing of the overall dump data to the system primary dump device.

The following described exemplary embodiments provide a system, method and program product to reduce the time required to collect diagnostic information upon a catastrophic system failure, thereby reducing the time to collect the data required for root cause analysis.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
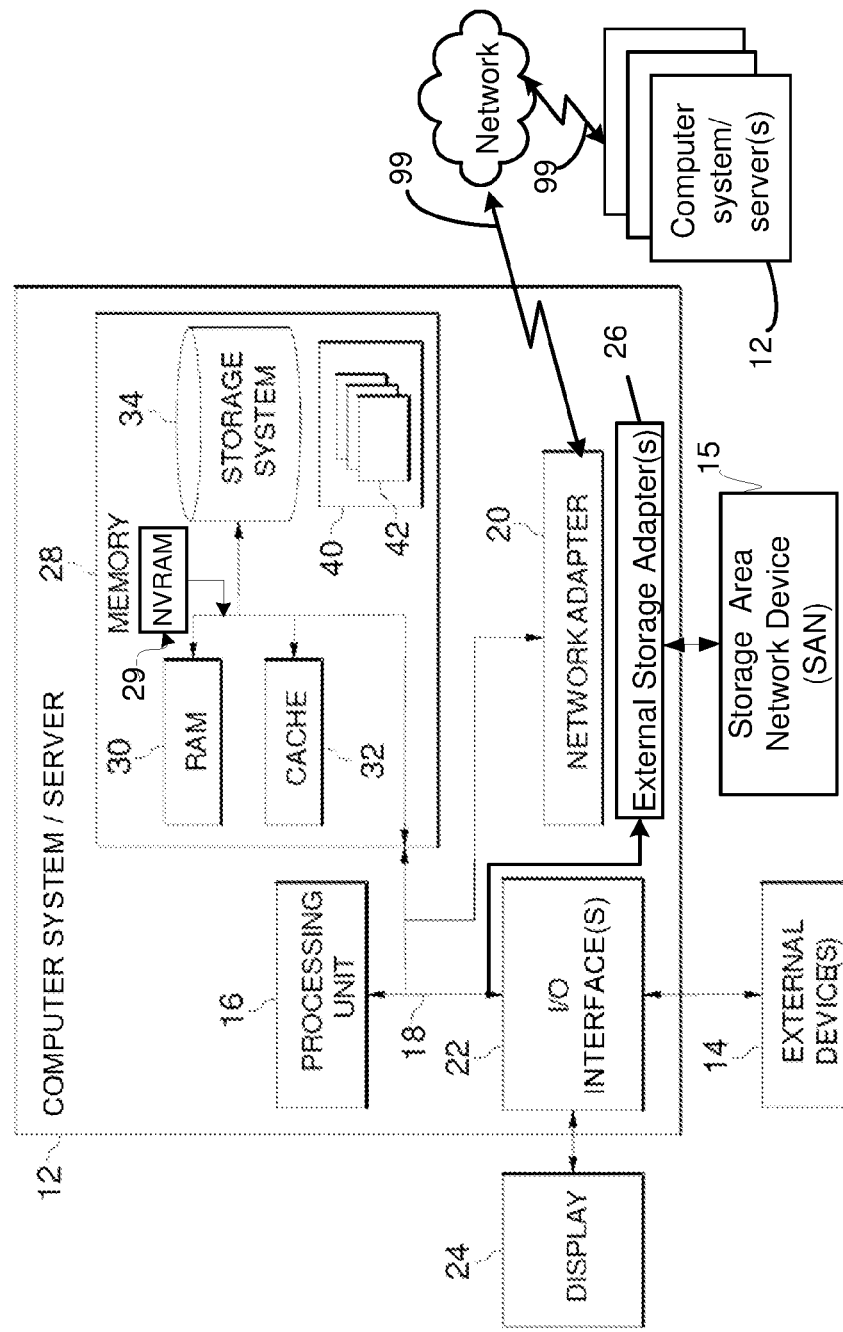
FIG. 1 illustrates an exemplary computing node operable for various embodiments of the disclosure.

Turning now to FIG. 1, a block diagram of an exemplary computer system (server) 12 operable for various embodiments of the disclosure is presented. As shown, the server 12 is only one example of a suitable computer for executing the program instructions for selecting and prioritizing memory regions during system dump generation, and is not intended to suggest any limitation as to the scope of use or functionality of embodiments of the disclosure described herein.

The server 12 is operational in numerous other computing system environments or configurations. For example, the server 12 may be a standalone machine, a virtual partition on physical host, a clustered server environment, or a distributed cloud computing environment that include any of the above systems or devices, and the like. When practiced in a distributed cloud computing environment, tasks may be performed by both local and remote servers 12 that are linked together and communicate through a communications network, such as the network 99.

The server 12 may be described in the context of executable instructions, such as a program, or more specifically, an operating system (OS) 40 that is an aggregate of program modules 42 being executed by the processing unit 16 to control the operation of the server 12. Program modules 42 perform particular tasks of the OS 40, such as process management; memory management; and device management. The OS 40 may maintain one or more device tables that associate an identifier to each of the devices connected to the server 12. Specialized program modules 42, referred to as device drivers, programmatically enable the OS 40 to exploit the capabilities of each of the connected devices. The program modules 42 may be implemented as routines, programs, objects, components, logic, or data structures, for example. The program modules 42 performing the particular tasks may be grouped by function, according to the server 12 component that the program modules 42 control. At least a portion of the program modules 42 may be specialized to execute the algorithms of FIGS. 2-3.

In a distributed computing environment, such as a cloud computing environment, each participating server 12 may be under the control of an OS 40 residing on each local and remote server 12, respectively. In a virtual machine, also referred to as a virtual server, each instance of the virtual machine is an emulation of a physical computer. A physical computer may host multiple virtual machine instances, each sharing the hardware resources of the physical computer, and each emulating a physical computer. Each of the virtual machine instances is under the control of an OS 40.

As shown in FIG. 1, the components of the server 12 may include, but are not limited to, one or more processors or processing units 16, a system memory 28, and a bus 18 that couples various system components, such as the system memory 28, to processor 16.

System memory 28 can include computer system readable media in the form of volatile memory, such as random access memory (RAM) 30 and/or cache memory 32. The server 12 may further include other removable/non-removable, volatile/non-volatile computer system storage media.

By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. The program modules 42, the OS 40, and one or more application programs may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via I/O interfaces 22. Still, the server 12 can communicate with one or more networks such as a local area network (LAN), a general wide area network (WAN), and/or a public network (e.g., the Internet) via a network adapter 20. As depicted, the network adapter 20 communicates with the other components of the server 12 via bus 18. External storage adapter 26 connects the server 12 with external storage subsystems, such as a storage area network device (SAN) 15. Exemplary external storage adapters 26 include, but are not limited to: a fibre channel, i.e., a host bus adapter (HBA); host channel adapter (HCA); SCSI; and iSCSI, depending upon the architectural implementation. The external storage adapter 26 communicates with the processing unit 16 and memory 28 of the server 12 over bus 18.

Additionally, a portion of the storage system 34 or SAN 15 may be configured as the server 12 primary system dump device for collection of the system memory regions in use at a given point of time, along with non-disruptive hardware device data. Another portion of the storage system 34 or SAN 15 may be configured as the secondary system dump device for collection of disruptive firmware state data. Similarly, a portion of memory 28 that is non-volatile random-access memory (NVRAM) 29 may be configured as a collection point for disruptive firmware state data, as will be more fully described with reference to FIG. 2.

It should be understood that although not shown, other hardware and/or software components could be used in conjunction with the server 12. Examples include, but are not limited to: microcode, device drivers, redundant processing units, external disk drive arrays, RAID systems, tape drives, and data archival storage systems, etc.

Figure 2:
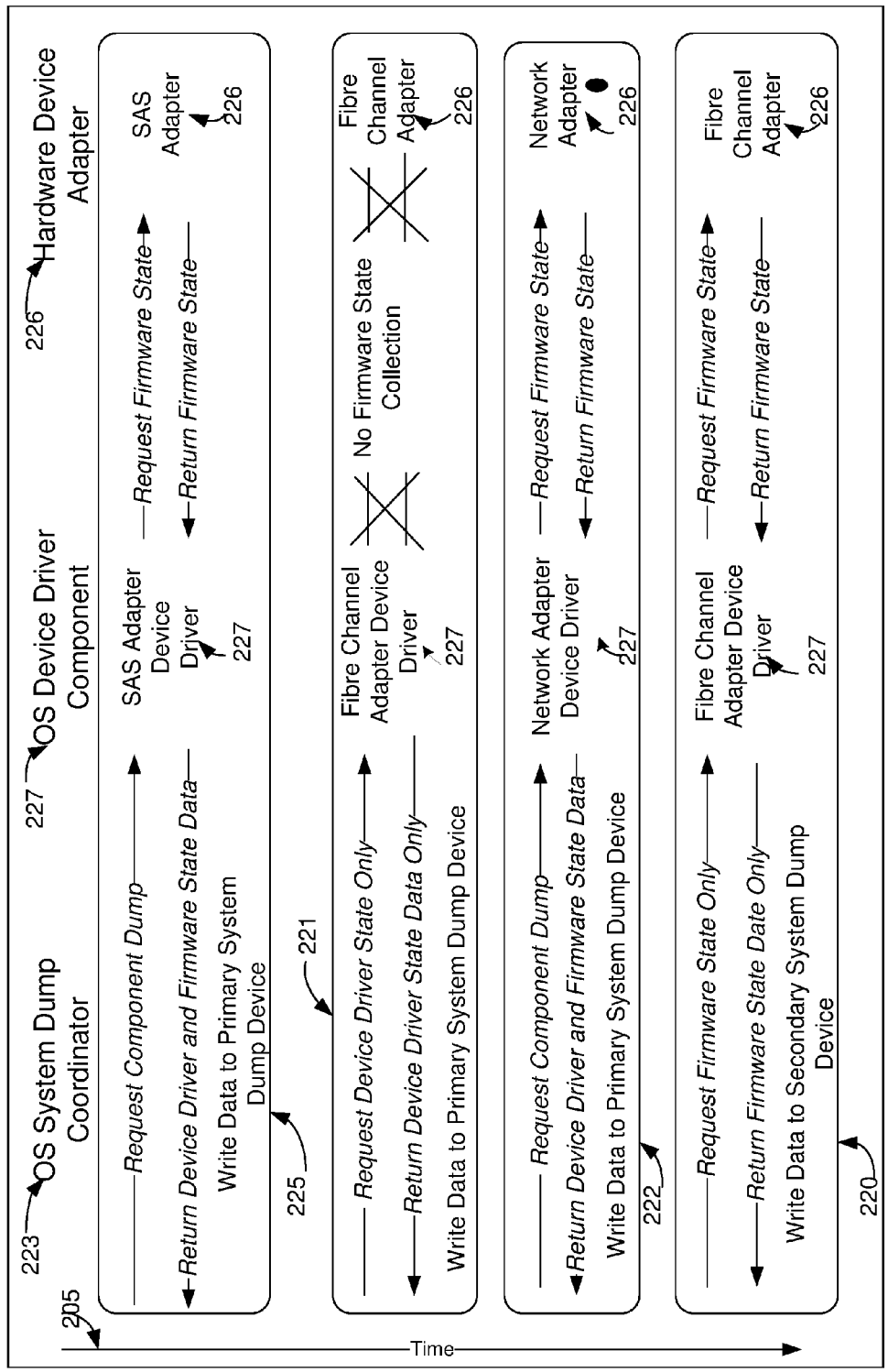
FIG. 2 is an operational model illustrating system dump data collection, according to various embodiments of the disclosure.

Referring now to FIG. 2, an operational model is depicted. FIG. 2 depicts at least a portion of a system dump data collection in progress over time 205. In operation, a hardware device, such as the SAN 15 (FIG. 1), is connected to the server 12 (FIG. 1) by a hardware device adapter 226 that is specialized according to the type of hardware device being connected. For example as shown, a serial attached small computer system interface (SAS) adapter 226 may connect a SAS disk device to the server 12 (FIG. 1). Similarly, a network adapter 226 enables external connectivity from the server 12 (FIG. 1) to other remote servers and workstations. Also shown in FIG. 2, a fibre channel adapter 226 may implement the fibre channel transport protocol (FCP), thereby connecting the server 12 (FIG. 1) to SAN storage devices, such as SAN 15 (FIG. 1).

Other specialized program modules 42 (FIG. 1), i.e., the OS device driver components 227, enable the OS 40 (FIG. 1) to access the capabilities of each of the connected hardware devices, such as the external devices 14, SAN 15, and display 24 of FIG. 1, without knowing details of the hardware device being accessed. The OS device driver component 227 is specific to the OS 40 (FIG. 1), the hardware device adapter 226, and the hardware device to which it is connected. For example, a SAS hardware device is connected to, and is controlled by, a SAS adapter 226, which provides a software interface through which the OS 40 (FIG. 1) sends I/O requests to the SAS hardware device.

In operation, the OS device driver component 227 receives Input/Output (I.O) requests for a connected hardware device from the OS 40 (FIG. 1). The OS device driver component 227 translates the received I/O requests into program instructions specific to the hardware device adapter 226. Each hardware device adapter 226 includes firmware, which may be referred to as program code that is stored in persistent memory on a hardware device. Persistent memory may be referred to as a type of non-volatile device memory that includes program code and state data. The firmware operates to cause the hardware device to perform the requested operations according to the protocols that the hardware device is intended to provide. In this example, the SAS adapter 226 may implement the SAS point-to-point protocol for the connected SAS hardware device(s).

Each software component in the server 12 (FIG. 1), for example each of the OS device driver components 227, may register in a component dump table a dump handler that the OS system dump coordinator 223 may invoke if a system dump is requested. As shown in 225 the OS system dump coordinator 223 may initiate a dump data collection by invoking the programming interface of the registered dump handler for the SAS adapter device driver 227. The OS system dump coordinator 223 may generally request state data from both the OS device driver component 227 and the hardware device adapter 226 in a single pass, i.e., non-disruptive capture, unless the hardware device adapter 226 is connected to the primary system dump device. Attempting firmware dump data collection may disable the hardware device adapter until it is reset by the next computer power recycle. This may be referred to as a disruptive collection. If a hardware device adapter 226 that is connected to the primary system dump device is rendered unusable through an attempt to collect state data, some or all of the collected system dump data may be lost. Consequently, disruptive collection of the hardware device adapter 226 state data is performed in a second pass. The OS system dump coordinator 223 may send an indicator, such as a flag or code, to the OS device driver component 226, to request either a one or two pass state data collection.

For example in 225, the OS system dump coordinator 223 sends an indicator that requests state data in one pass from the SAS adapter device driver 227 which, as shown, is not connected to the primary system dump device. The state data contents of each OS device driver component 227 and hardware device adapter 226 pair may be specialized according to the capabilities of the hardware device adapter 226 and the protocol being supported. For example, the OS device driver component 227 state data may include: a listing of device driver entry points and functions; parameters, variables and their respective values; flags and condition code settings; and contents of computer system memory regions in use. In 225, since the SAS adapter 226 is not the primary system dump device, based on the setting of the indicator, the SAS adapter device drive 227 may request firmware state data from the associated SAS adapter 226. Firmware dump data collection from a hardware device adapter 226 may include the state of operations in progress, and the contents of the persistent memory on the hardware device adapter 226. The SAS adapter device driver 227 may return to the OS system dump coordinator 223 a combined dump image that integrates both the firmware state data from the SAS adapter 226 and the SAS adapter device driver 227 state data. Alternatively, the SAS adapter device driver 227 may return the state data as two separate images. The OS system dump coordinator 223 may write the returned state data to the primary system dump device.

In the exemplary dump data collection of 221, the fibre channel adapter device driver 227 is associated with the fibre channel adapter 226 that is connected to the primary system dump device. Therefore, the OS system dump coordinator 223 indicator accompanying the dump data collection may request a non-disruptive state data collection only. In this case, the state data request is non-disruptive, since dump data collection occurs in two passes. During the first pass, the fibre channel adapter device driver state data is returned to the OS system dump coordinator 223, which writes the returned state data to the primary system dump device. Firmware state data from the fibre channel adapter 226 may be requested in a subsequent second pass.

However, in 222, although the subject OS device driver component 227 is a network adapter device driver 227 rather than a SAS adapter device driver 227, the processing flow is substantially similar to that previously described with reference to 225. The OS system dump coordinator 223 sends an indicator to the network adapter device driver 227 to initiate a non-disruptive state data collection from the network adapter 226 in a single pass. As in 225, the network adapter device driver 227 may return the state data as one integrated dump image or as two separate images. Upon receiving the state data from the network device driver 227, the OS system dump coordinator 223 may write the returned state data to the primary system dump device. It should be noted that the two passes of state data collection from the primary system dump device may occur consecutively, where the primary system dump device is the last device in the system device list. However, as shown in FIG. 2, several intervening state data collections may occur.

When non-disruptive state data collection is completed for any remaining OS device driver component 227 and hardware device adapter 226 pairs, in 220 the OS system dump coordinator 223 completes state data collection by sending a request for disruptive state data collection in a second pass to the fibre channel adapter device driver 227 that is associated with the primary system dump device. The OS system dump coordinator 223 writes the returned firmware state data to a secondary system dump device. The secondary system dump device is configured to receive firmware state data from the hardware device adapter 226 that is connected to the primary system dump device. Since the size of the firmware state data is a small portion of the total system dump data collected, the secondary system dump device may be one that is smaller, simpler and less prone to failure that the primary system dump device, such as universal serial bus (USB), enhanced integrated drive electronics (EIDE), and serial ATA (SATA) devices. In one embodiment, the secondary system dump device is a removable media device, such as a flash thumb drive which may be retrieved from the server 12 (FIG. 1) and inserted into another server 12 (FIG. 1) for diagnostic analysis. In another embodiment, the secondary system dump device may include NVRAM 29 (FIG. 1). NVRAM, such as flash memory, is computer memory that retains information stored within it when power to the computer is turned off. In this embodiment, the OS system dump coordinator 223 may save the firmware state data to NVRAM 29 (FIG. 1). Upon server 12 (FIG. 1) reboot, the OS 40 (FIG. 1) may copy the saved firmware state data to a file on a filesystem or another device, and alert a systems administrator by a message in the system log, email, text or other notification.

Figure 3:
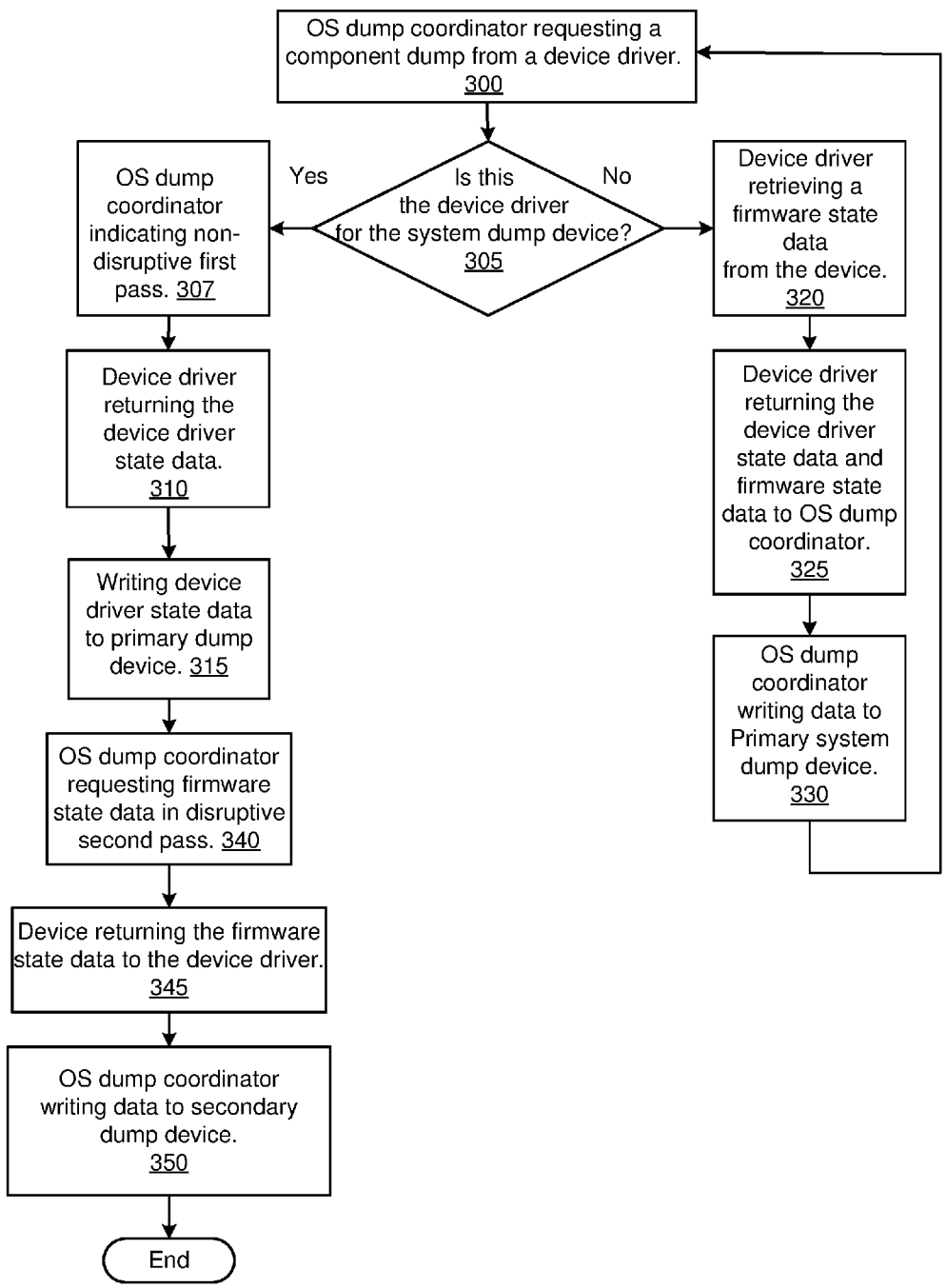
FIG. 3 is a flowchart illustrating the algorithm of FIG. 2, according to various embodiments of the disclosure.

FIG. 3 is a flowchart illustrating the algorithm of FIG. 2, according to various embodiments of the disclosure. At 300 the OS dump coordinator 223 (FIG. 2) of the OS 40 (FIG. 1) requests a component dump from an OS device driver component 227. The OS device driver component 226 provides a software interface between the OS 40 (FIG. 1) and the connected hardware device by translating operation requests from the OS 40 (FIG. 1) into commands that the firmware of the associated hardware device adapter 226 (FIG. 2) may use to operate the connected hardware device.

At 305, in the request to initiate state data collection, the OS system dump coordinator 223 (FIG. 2) may include at 307 a code or flag indicating that the hardware device adapter 226 (FIG. 2) is connected to the primary system dump device. In that case, a non-disruptive first pass data collection from the primary system dump device is indicated. If the hardware device adapter 226 (FIG. 2) is connected to the primary system dump device, at 310 the OS device driver component 227 (FIG. 2) may return the device driver state data to the OS system dump coordinator 223 (FIG. 2) without firmware state data from the associated hardware device adapter 226 (FIG. 2). The OS device driver component 227 (FIG. 2) may not request firmware dump data from the hardware device adapter 226 (FIG. 2) connected to the primary system dump device, since to do so would render the hardware device adapter 226 unusable and may result in the loss of at least some of the system dump data already written to the primary system dump device. At 315, the OS system dump coordinator 223 (FIG. 2) may write the returned system driver state data to the primary system dump device configured by the OS 40 (FIG. 1) as a repository for diagnostic dump data collection. At 340, The OS system dump coordinator 223 (FIG. 2) may initiate a second pass, that is disruptive, to obtain firmware state data from the hardware device adapter 226 (FIG. 2) that is connected to the primary system dump device. Since only the hardware device adapter 226 (FIG. 2) for the primary system dump device remains, firmware state data may be collected without concern that the primary system dump device may become unusable. At 345, the firmware state data from the hardware device adapter 226 (FIG. 2) is returned to the OS device driver component 227 (FIG. 2). At 350 the returned firmware state data is subsequently returned to the OS system dump coordinator 223 (FIG. 2), that may write the firmware state data to a secondary system dump device that is configured to receive firmware state data from the hardware device adapter 226 (FIG. 2) that is connected to the primary system dump device.

However, at 305 if the OS device driver component 227 (FIG. 2) is not associated with the hardware device adapter 226 (FIG. 2) that is connected to the primary system dump device, at 320 the OS device driver component 227 (FIG. 2) may request firmware state data from the associated hardware device adapter 226 (FIG. 2). At 325, the OS device driver component 227 (FIG. 2) may return to the OS system dump coordinator 223 (FIG. 2) a combined dump image that integrates both the firmware state data and the OS device driver component 227 (FIG. 2) state data. Alternatively, the OS device driver component 227 (FIG. 2) may return the state data as two separate images. At 330, the OS system dump coordinator 223 (FIG. 2) may write the returned state data to the primary system dump device.

Figure 4:
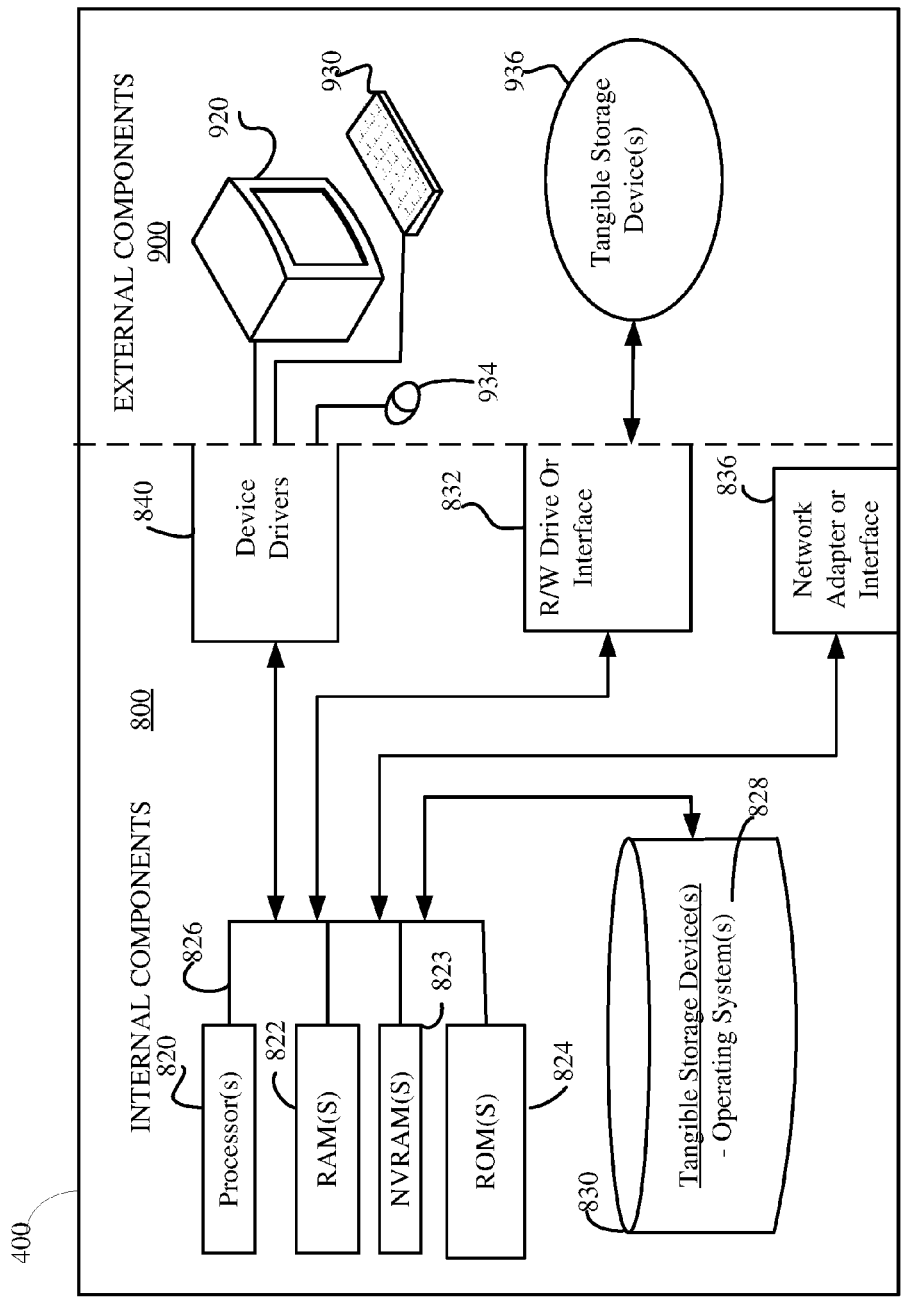
FIG. 4 is a schematic block diagram of hardware and software of the computer environment according to an embodiment of the processes of FIGS. 2-3.

Referring now to FIG. 4, computing device 400 may include respective sets of internal components 800 and external components 900 that together may provide an environment for a software application. Each of the sets of internal components 800 includes one or more processors 820; one or more computer-readable RAMs 822; one or more NVRAMs 823; one or more computer-readable ROMs 824 on one or more buses 826; one or more operating systems 828 executing the method of FIGS. 2-3; and one or more computer-readable tangible storage devices 830. The one or more operating systems 828 (including the additional data collection facility) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

The NVRAMs 823 may be configured as the secondary system dump device where firmware state data may be collected. A portion of the computer-readable tangible storage device 830 may be configured as the primary system dump device for diagnostic data, including system memory regions in use at a given point of time, along with non-disruptive hardware device data. A computer-readable tangible storage device 830 may also be configured as a secondary system dump device for the collection of disruptive firmware state data.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device. A computer-readable tangible storage device 936 may be configured as a primary system dump device for the collection of non-disruptive state data or as a secondary system dump device for the collection of disruptive firmware state data.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 400, can be downloaded to computing device 400 from an external computer (e.g., server) via a network (for example, the Internet, a local area network, or other wide area network) and respective network adapters or interfaces 836. From the network adapters (or switch port adapters) or interfaces 836 and operating system 828 associated with computing device 400 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A computer program product for firmware dump collection from a primary dump adapter comprising a computer readable storage medium readable by a processing circuit and storing instructions for execution by the processing circuit for performing a method comprising:

identifying a primary system dump device and a secondary system dump device, wherein the primary and the secondary system dump devices include non-transitory computer-readable tangible storage, and wherein both the primary and the secondary dump devices are defined to both the operating system (OS) and the firmware and, wherein an operating system (OS) dump coordinator writes non-disruptive state data to the primary system dump device, and wherein the operating system dump coordinator writes disruptive state data to the secondary system dump device;

requesting non-disruptive state data from a hardware device adapter wherein collecting non-disruptive state data does not disable the hardware device adapter, based on the hardware device adapter not being connected to the primary system dump device, and wherein the non-disruptive state data includes device driver software state data and firmware state data;

requesting disruptive state data from the hardware device adapter wherein collecting disruptive state data disables the hardware device adapter, based on the hardware device adapter being connected to the primary system dump device, and wherein the disruptive state data includes hardware device adapter firmware state data;

writing non-disruptive state data to the primary system dump device; and writing disruptive state data to the secondary system dump device.

* * * * *